United States Patent
Schlosser et al.

[11] Patent Number: 6,131,562
[45] Date of Patent: Oct. 17, 2000

[54] GRILL WITH IMPROVED GAS MANIFOLD

[75] Inventors: Erich J. Schlosser, Barrington; James C. Stephen, Arlington Heights; J. Michael Alden, Palatine, all of Ill.

[73] Assignee: Weber-Stephen Products Co., Palatine, Ill.

[21] Appl. No.: 09/255,008

[22] Filed: Feb. 22, 1999

Related U.S. Application Data

[63] Continuation-in-part of application No. 08/523,029, Sep. 1, 1995, Pat. No. 5,873,355.

[51] Int. Cl.[7] .................................................. A47J 37/00
[52] U.S. Cl. ......................... 126/41 R; 126/50; 431/343; 431/344
[58] Field of Search ................................. 126/41 R, 38, 126/50, 39 R, 40, 39 N, 39 E, 39 J, 9 R, 25 R, 41 B; 431/343, 344, 157

[56] References Cited

U.S. PATENT DOCUMENTS

| | | |
|---|---|---|
| D. 293,067 | 12/1987 | Stephen et al. . |
| D. 298,406 | 11/1988 | Stephen et al. . |
| D. 316,355 | 4/1991 | Stephen et al. . |
| 596,975 | 1/1898 | Bent . |
| 1,106,569 | 8/1914 | Kessler . |
| 1,224,157 | 5/1917 | Fry . |
| 1,735,151 | 11/1929 | Blaskewitz et al. ................. 126/38 |
| 1,833,147 | 11/1931 | Atkinson . |
| 2,207,307 | 7/1940 | Teller et al. . |
| 2,304,140 | 12/1942 | Bergholm . |
| 2,484,239 | 10/1949 | Moon et al. . |
| 2,530,166 | 11/1950 | Johannsen . |
| 2,541,528 | 2/1951 | McAvoy . |
| 2,742,893 | 4/1956 | Keffer . |
| 2,780,474 | 2/1957 | Farah et al. . |
| 2,787,995 | 4/1957 | Alter . |
| 2,886,386 | 5/1959 | Spitzer . |
| 3,124,057 | 3/1964 | Kiser . |
| 3,421,458 | 1/1969 | Salkoff et al. . |
| 3,545,908 | 12/1970 | Lohman . |
| 3,586,518 | 6/1971 | Folmar . |
| 3,683,791 | 8/1972 | Rast, Jr. . |
| 3,802,413 | 4/1974 | Pepin . |
| 3,824,984 | 7/1974 | Swanson et al. . |
| 4,089,258 | 5/1978 | Berger . |
| 4,108,142 | 8/1978 | Barson et al. . |
| 4,321,857 | 3/1982 | Best . |
| 4,337,751 | 7/1982 | Sampson et al. . |
| 4,350,140 | 9/1982 | Hamilton, Jr. . |
| 4,362,093 | 12/1982 | Griscom . |
| 4,422,435 | 12/1983 | Spell . |
| 4,485,972 | 12/1984 | Freber . |
| 4,488,534 | 12/1984 | Koziol . |
| 4,508,095 | 4/1985 | Bloechel . |

(List continued on next page.)

FOREIGN PATENT DOCUMENTS

| | | | |
|---|---|---|---|
| 46671 | 8/1964 | Australia . | |
| A-34964/89 | 12/1989 | Australia . | |
| 991496 | 6/1976 | Canada . | |
| 2582086 | of 0000 | France . | |
| 465841 | 9/1928 | Germany . | |
| 276405 | 6/1930 | Italy ..................................... | 126/39 R |
| 35334 | 8/1938 | Japan ................................... | 126/41 R |
| 38189 | 4/1936 | Netherlands . | |
| 143701 | 11/1919 | United Kingdom . | |
| 143701 | 6/1920 | United Kingdom . | |
| 491169 | 8/1938 | United Kingdom ................. | 126/39 R |
| WO 87/00410 | 1/1987 | WIPO . | |

*Primary Examiner*—James C. Yeung
*Attorney, Agent, or Firm*—Wallenstein & Wagner, Ltd.

[57] ABSTRACT

A removable gas manifold assembly for a gas grill having a manifold bracket and a gas manifold connected to the manifold bracket. The manifold bracket has a substantially horizontal portion thereto at each end thereof, respectively, defining engaging surfaces. The engaging surfaces slidingly engage support surfaces of support members connected to a frame of the gas grill. The manifold has a gas valve with an exit port which is adapted to be in fluid communication with an entry port of a burner of the gas grill when the manifold is operationally positioned.

35 Claims, 5 Drawing Sheets

U.S. PATENT DOCUMENTS

| | | |
|---|---|---|
| 4,526,532 | 7/1985 | Nelson . |
| 4,583,452 | 4/1986 | Grosse . |
| 4,587,948 | 5/1986 | Haglund . |
| 4,593,676 | 6/1986 | Wackerman . |
| 4,635,613 | 1/1987 | Tucker et al. . |
| 4,662,349 | 5/1987 | McKenzie et al. . |
| 4,665,888 | 5/1987 | Christen, Jr. et al. . |
| 4,677,964 | 7/1987 | Lohmeyer et al. . |
| 4,686,957 | 8/1987 | Koziol . |
| 4,686,958 | 8/1987 | Skelton et al. . |
| 4,688,541 | 8/1987 | Stephen et al. . |
| 4,700,618 | 10/1987 | Cox, Jr. . |
| 4,705,021 | 11/1987 | Beach . |
| 4,718,399 | 1/1988 | Shepard . |
| 4,727,853 | 3/1988 | Stephen et al. . |
| 4,773,319 | 9/1988 | Holland . |
| 4,788,962 | 12/1988 | Mashburn et al. . |
| 4,829,978 | 5/1989 | Schlosser . |
| 4,860,724 | 8/1989 | Schlosser et al. . |
| 4,886,045 | 12/1989 | Ducate, Jr. et al. . |
| 4,899,725 | 2/1990 | Barron . |
| 4,924,846 | 5/1990 | Peacock et al. . |
| 5,016,607 | 5/1991 | Doolittle et al. . |
| 5,033,448 | 7/1991 | Sandweg . |
| 5,050,577 | 9/1991 | Baynes et al. . |
| 5,070,776 | 12/1991 | Schlosser et al. . |
| 5,072,718 | 12/1991 | Seal . |
| 5,076,252 | 12/1991 | Seal . |
| 5,076,256 | 12/1991 | Raymer et al. . |
| 5,076,257 | 12/1991 | Raymer et al. . |
| 5,088,470 | 2/1992 | James, Jr. et al. . |
| 5,090,398 | 2/1992 | Raymer et al. . |
| 5,140,973 | 8/1992 | Home . |
| 5,165,385 | 11/1992 | Doolitle et al. . |
| 5,291,875 | 3/1994 | Koziol . |
| 5,323,758 | 6/1994 | Minshall et al. . |
| 5,333,596 | 8/1994 | Clifford . |
| 5,341,793 | 8/1994 | Brown . |
| 5,408,985 | 4/1995 | Giebel et al. . |
| 5,452,707 | 9/1995 | Harris et al. . |

FIG.1

GRILL WITH IMPROVED GAS MANIFOLD

RELATED APPLICATIONS

This application is a continuation-in-part of U.S. patent application Ser. No. 08/523,029, filed Sep. 1, 1995, now U.S. Pat. No. 5,873,355. U.S. patent application Ser. No. 08/523,029, U.S. Pat. No. 5,873,355 is hereby incorporated herein by reference, and made a part hereof.

TECHNICAL FIELD

The present invention generally relates to outdoor cooking grills, and more particularly to a gas grill with an improved frame and working surfaces, and an improved gas supply system.

BACKGROUND OF THE INVENTION

Gas grills have become very popular as outdoor portable cooking devices. Gas barbecue grills generally consist of a cooking chamber supported by a support frame. Portable gas grills employ a cart-type support frame for the cooking chamber that is supported on wheels and has a cooking chamber thereon. These support structures are usually made of square tubing sections connected together with fasteners, such as bolts and the like. In recent years, and particularly in connection with gas grills, an effort has been made by the industry to increase cooking space and work space on the grill. As such, the support frames of the grills are often equipped to have a work table surface adjacent to the cooking chamber, or an auxiliary burner. Accordingly, size and complexity of the grills has increased. While certain of such grill designs have had a good degree of success, certain problems exist. For example, the added size and component complexity of these grills has reduced portability of the grills and has also made it more difficult to store the grills when not in use, such as in cold weather seasons.

Further, when side accessories, such as work tables, are attached to and extend from the cart frame, the side structure is generally weak resulting in loss of integrity of the side accessory attachment. To avoid this problem, various support arms which extend diagonally from the outer underside of the side table to the support frame have been employed. The result of these designs is a cart structure that has exposed unsightly support members, and which has more parts and connections, making it even more difficult to assemble.

It is thus an object of the present invention to provide a grill with ample cooking and work space but which is relatively easily transported and stored.

Additionally, to increase the portability of gas grills and make it easier to store the grill during periods of non-use, an improved gas supply system is required. As such, it is a further object to provide such a grill with features which provide an enhanced gas supply system, including an improved gas manifold.

It is also an object to provide such a grill which is suitable for compact packaging and is superior in construction with relatively minimum manufacturing cost and assembly time related thereto.

SUMMARY OF THE INVENTION

The improved gas manifold assembly of the present invention is adapted to be utilized in conjunction with a gas grill and includes a gas manifold bracket connected to a manifold member. In general, the gas grill has a burner housing connected to a grill support assembly, and further includes at least one burner having a gas entry at an end thereof. The grill additionally has at least one support member having a generally horizontal support surface positioned outside the burner housing. The manifold bracket of the gas manifold assembly slidingly engages support surfaces of the support members of the grill. When properly engaged the gas exit port of the gas manifold is fitted in fluid communication with the gas entry port of the burner.

According to one aspect of the present invention, the manifold bracket further comprises a first angled member adjacent a first end of the manifold bracket and a second angled member adjacent a second end of the manifold bracket. The first angled member has a substantially horizontal engaging surface capable of slidingly engaging the horizontal support surface of the support member. Similarly, the second angled member has a substantially horizontal engaging surface capable of slidingly engaging the horizontal support surface of the support member.

According to another aspect of the present invention, a substantially planar portion of the manifold bracket extends in a first plane, and the substantially horizontal portions of the first and second angled members extend in a second and parallel, but different, plane than the first plane.

According to another aspect of the present invention, the supporting surface of the support member includes a first support surface and a second support surface. The first support surface is substantially horizontal to and spaced a distance from the second support surface. As such, the engaging surface of the manifold bracket engages the support member partially between the first and second support surfaces thereof.

According to another aspect of the present invention, a first tab depends from and extends away from the first engaging surface of the manifold bracket. Similarly, a second tab depends from and extends away from the second engaging surface of the manifold bracket. The tab extends substantially perpendicular to the horizontal engaging surfaces of the manifold bracket. The tabs are adapted to engage the support member and to position the gas manifold assembly with respect to the support member. As such, the tabs prevent further lateral movement of the manifold bracket toward the burner entry port.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENT

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
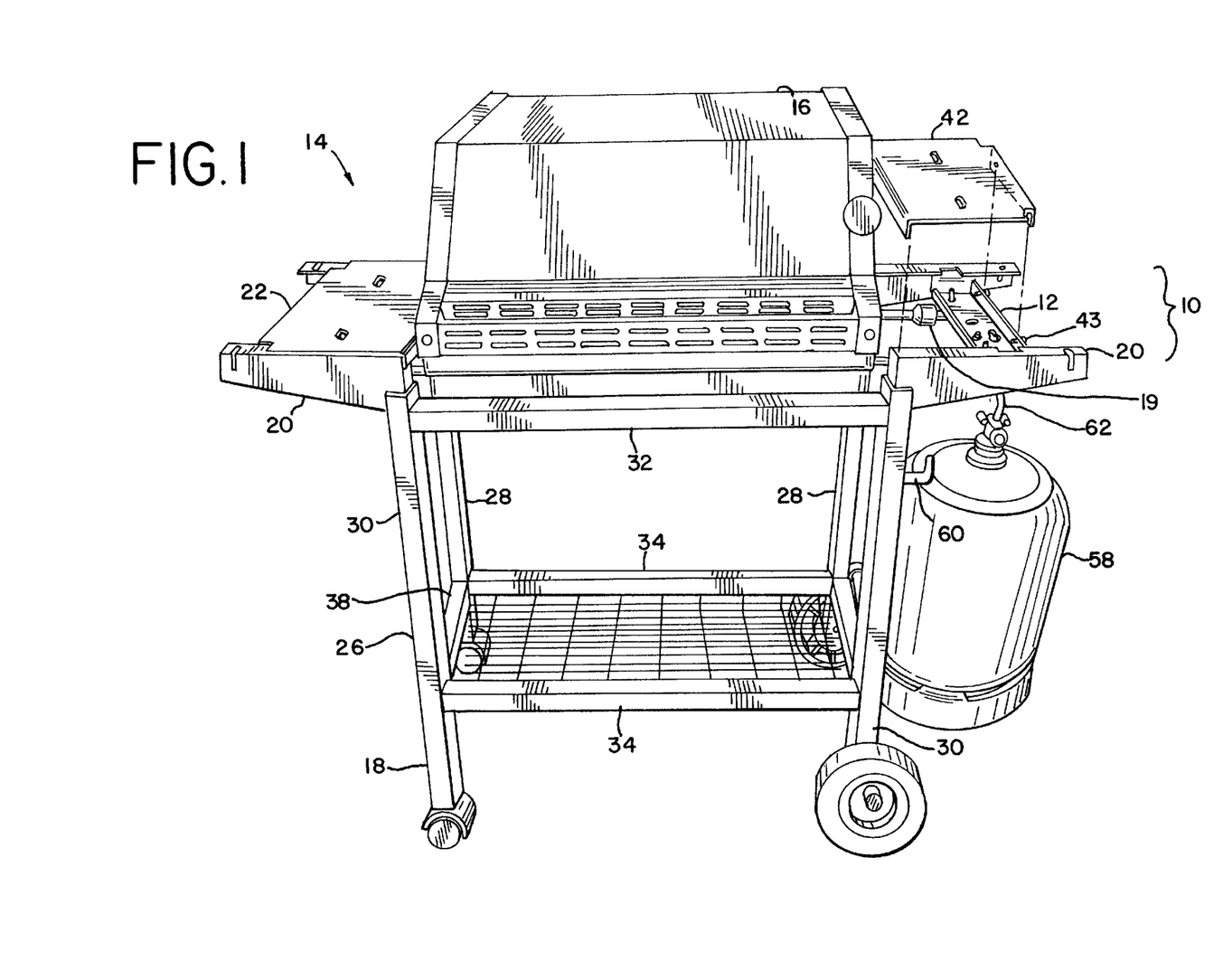
FIG. 1 is a front perspective view of a grill in accordance with the present invention.
Figure 3:
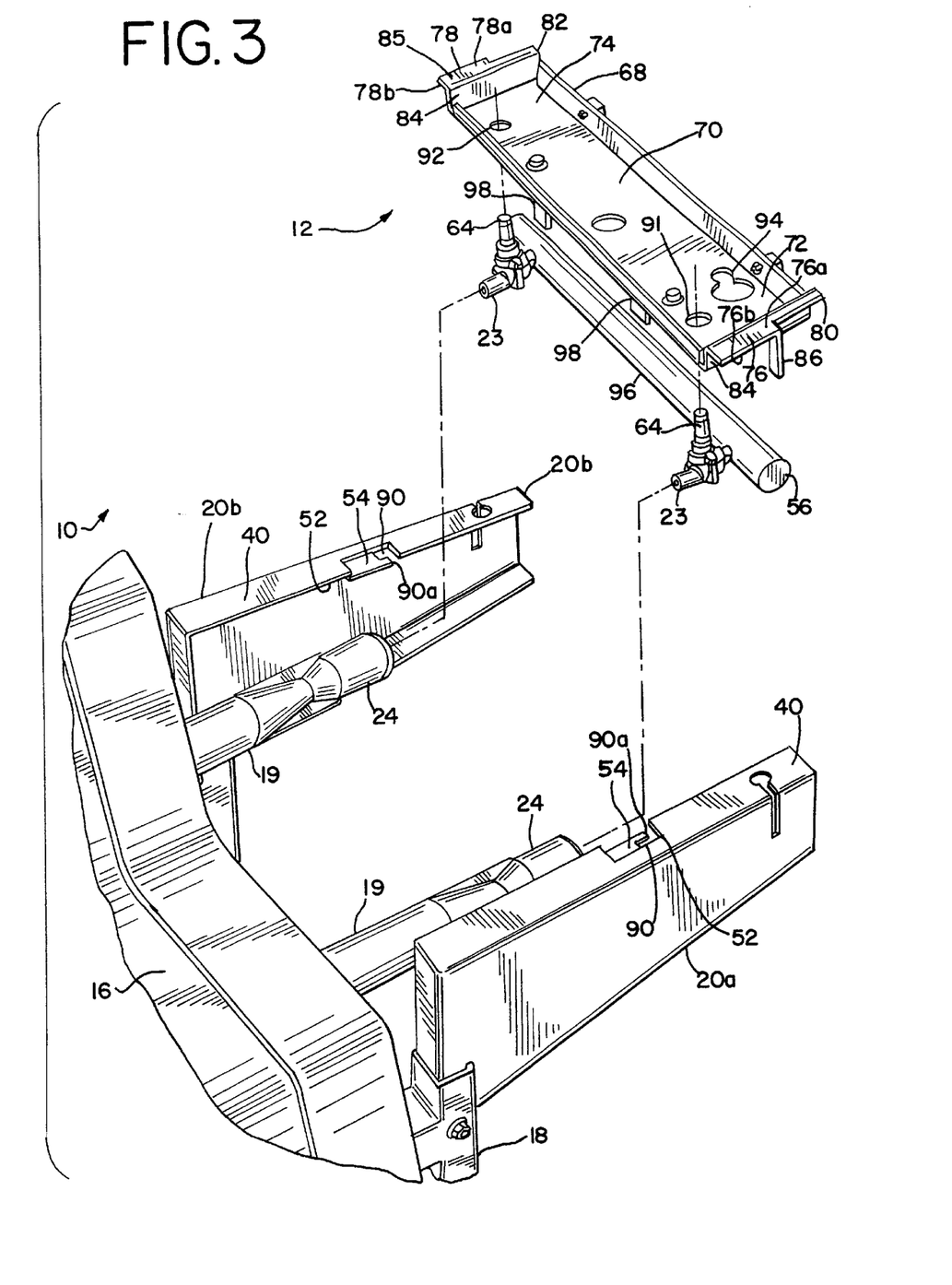
FIG. 3 is a partial front perspective view of the grill of FIG. 1, showing a manifold construction thereof in exploded view.

Referring now in detail to the Figures, and initially to FIGS. 1 and 3, there is shown a preferred embodiment of a gas supply system 10 including a removable gas manifold assembly 12 for a gas barbecue grill 14 constructed in accordance with the present invention. The gas barbecue grill assembly 14 shown in FIG. 1 has a burner housing 16, a frame or support assembly 18 to support the burner housing 16, at least one burner 19, support members 20, a work surface 22, and a gas supply system 10. Portions of each burner 19 are located in the burner housing 16 and portions of each burner 19 are exposed from the housing 16. A gas entry port 24 is connected to the end of the burner 19 at the exposed portion.

The support frame 18 (i.e., the grill support assembly) or cart of the barbecue grill is preferably constructed of tubing, and is most preferably constructed of two independent frame structures, a front frame member 26 and a rear frame member 28. The front frame member has two vertical members 30 connected to an upper horizontal member 32 and a lower horizontal member 34. The rear frame member 28 is similarly constructed of two vertical members 30 connected to an upper horizontal member 32 and a lower horizontal member 34. In the preferred embodiment the vertical members 30 of the front and rear frame members are welded to the upper and lower horizontal members 32,34, respectively. According to this construction the frame has front and rear frame structures which are manufactured and pre-assembled for packaging and shipping. Accordingly, final assembly of the frame requires only securing the front frame member to the rear frame member.

The front and rear frame members 26,28 are joined in spaced relation by two upper cross members 36 (not shown) and two lower cross members 38. The upper and lower cross members are attached to the front and rear frame members by mechanical engagement of the respective components, generally including bolts and threaded receivers. The front and rear frame members are secured together by the cross members such that the cart has an inner space suitable for receiving and supporting the burner housing. In the preferred embodiment, the burner housing 16 is connected to the grill support assembly 18 via ledges of the burner housing engaging the upper horizontal members of the front and rear frames.

Figure 2:
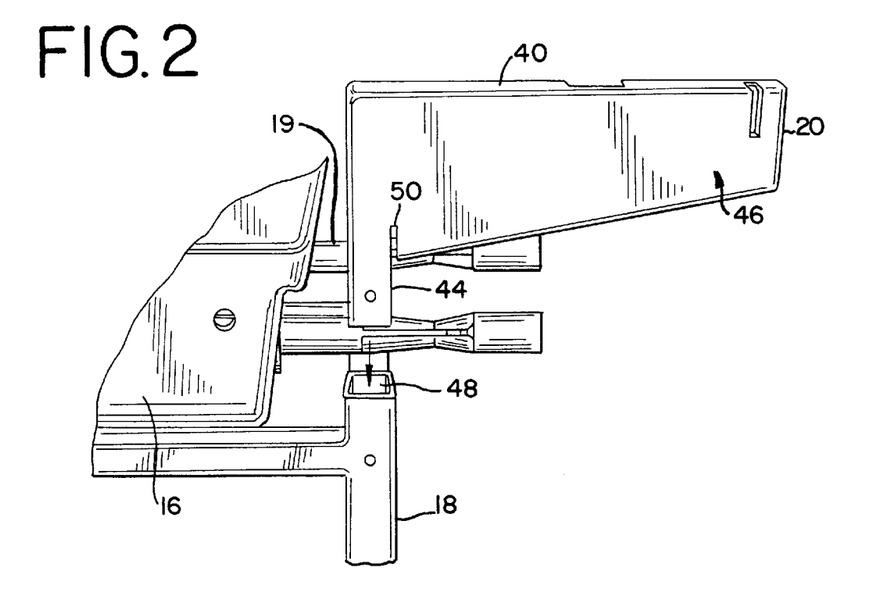
FIG. 2 is a partial front exploded view, in perspective, of the grill and support frame of FIG. 1.

As disclosed in FIG. 2, the grill 14 of the present invention also provides at least one side support member 20 having a generally horizontal support surface 40 positioned outside the burner housing. The support members 20 depend from and are adapted to be removably fixed to the grill support assembly 18. In the preferred embodiment, the support members 20 are cantilevered from the grill support assembly 18 and are adapted to support a variety of accessories, including: work tables 22, the gas manifold assembly 12, and the control panel 42 for the grill. As illustrated in FIG. 1, four support members 20 are attached to and extend from the grill support assembly. Specifically, two support member extend from and are adjacent to each side of the burner housing. More specifically, a first support member 20a having a support surface 40 and a second support member 20b having a support surface 40 are connected to the grill support assembly 18 for supporting the gas manifold assembly 12. The support members 20 may alternately, however, be adjacent the front of the housing depending on the overall configuration of the grill and alternative arrangement of the burner 19. The support members 20 are preferably made of sheet metal which is cut and formed or bent to the desired shape. It is understood, however, that the support members may be made of a variety of other means, including frame extensions of the tubular grill frame 18 itself. In such a configuration, the support members 20 are integral with, and a part of, the grill frame or grill support assembly 18. As such, at least one generally horizontal support surface is integral with the portion of the grill support assembly 18 that is positioned outside the housing 16.

As illustrated in FIG. 2, in the preferred embodiment the support member 20 has a generally horizontal support surface 40 and a projection 44 depending therefrom. A side wall 46 of the support member 20 depends from the top of the support member 20 and is bent approximately 90° with respect to the top. The projection 44 extends downward from the side wall 46. The projection 44 is generally comprised of two adjacent formed and bent walls in the configuration of an angle iron. The projection 44 is designed and manufactured such that it is adapted to extend into a receiving portion 48 of the grill support assembly 18, as shown in FIG. 2, to support the support member 20 and any components attached thereto. A slot 50 adjacent the projection 44 separates a portion of the side wall 46 from the projection 44. The top of the slot 50 defines the portion of the projection 44 that is inserted or extended into the receiver 48 of the grill support assembly.

As shown in FIGS. 2 and 3, the support member 20 has a plurality of generally horizontal support surfaces integral with and/or connected to the grill support assembly. In the preferred embodiment, the support member 20 has a first support surface 52 and a second support surface 54. The first and second support surfaces 52,54 are formed by bending a portion of the support surface 40 of the support member 20 with respect to the top of the support member. Generally, the first support surface 52 includes an underside surface of the support surface 40, and the second support surface 54 includes a topside surface of the support surface 40 after forming and bending. The first and second support surfaces 52,54 are substantially parallel to one another, and are spaced a distance apart from each other. Additionally, the second support surface 54 has an edge 90 adjacent an edge protrusion 90a. As such, a gap is present between the first support surface 52 and the second support surface 54. The relationship of the first and second support surfaces 52,54 provides a means for engaging the gas manifold assembly 12 as is further explained below.

FIGS. 1 and 3–5 disclose the gas supply system 10 of the present invention. The gas supply system supplies gas to the gas grill, and specifically the burners, for combustion of gas during operation of the grill. The gas supply system 10 includes a gas container or tank 58, a holder 60 for holding the tank and securing the tank to the grill, and a gas manifold assembly. A gas transfer line 62 connects the manifold 56 to the tank 58 and provides for transferring gas from the tank to the manifold. A pair of rotatable gas shut-off valves 64 connected to the exit ports of the manifold adjust the flow of gas to the burners. As will be disclosed in more detail below, the gas manifold assembly and supporting structure provide that the gas supply system is engageable with and attachable to the grill support assembly upon cooperation of a portion of the geometry of the gas supply system and a portion of the geometry of the supporting members. As a result, the gas supply system 10 can be removed from the grill 14 as a unit without disconnecting the gas transfer line 62 from the manifold 56. Additionally, not only is the gas supply system of the present invention more securely retained to the grill than previous gas supply systems, but also no tools are needed to remove the gas supply system from the grill.

Figure 4A:
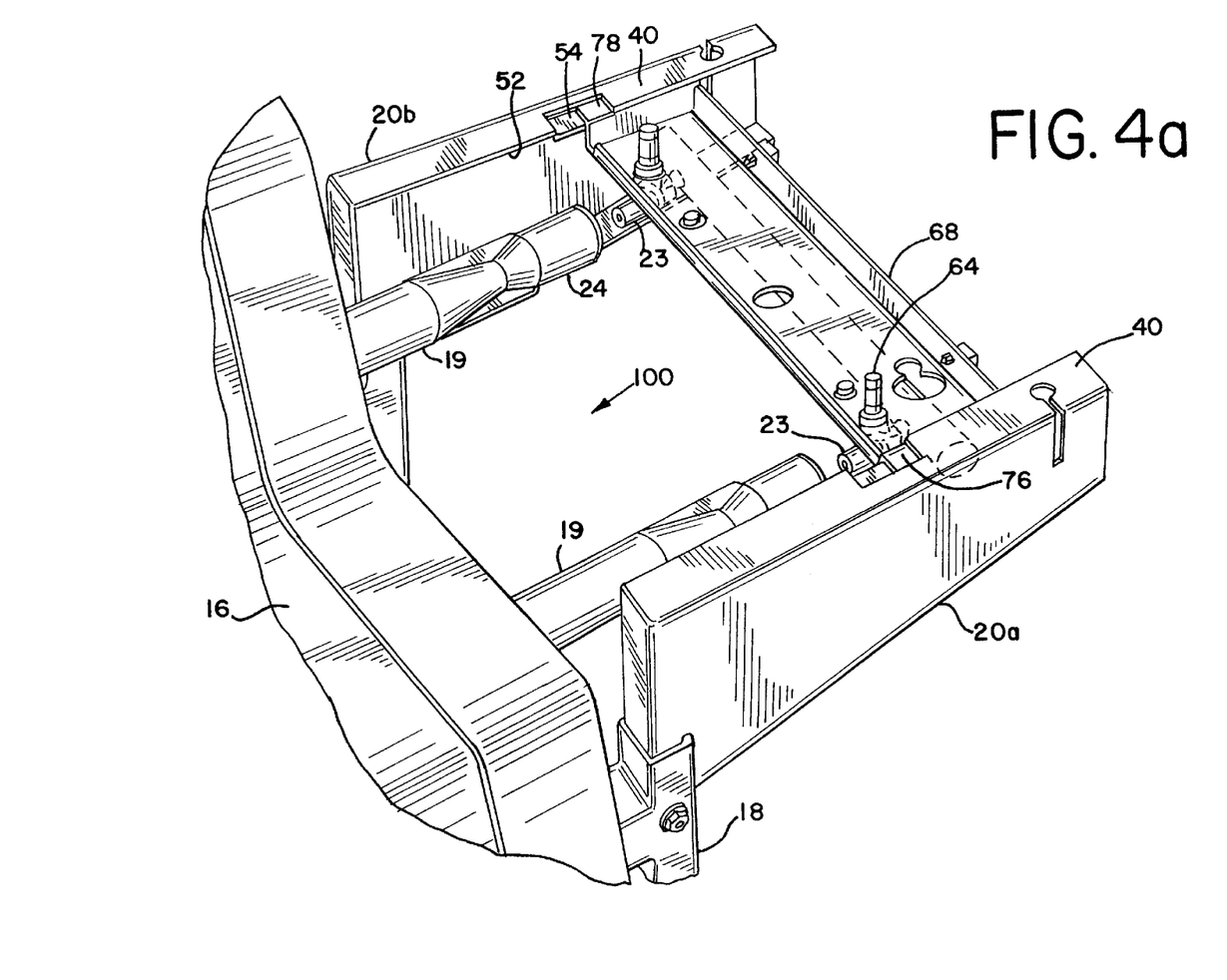
FIG. 4A is a partial front perspective view of the grill of FIG. 1, showing a partially installed gas manifold assembly.
Figure 4B:
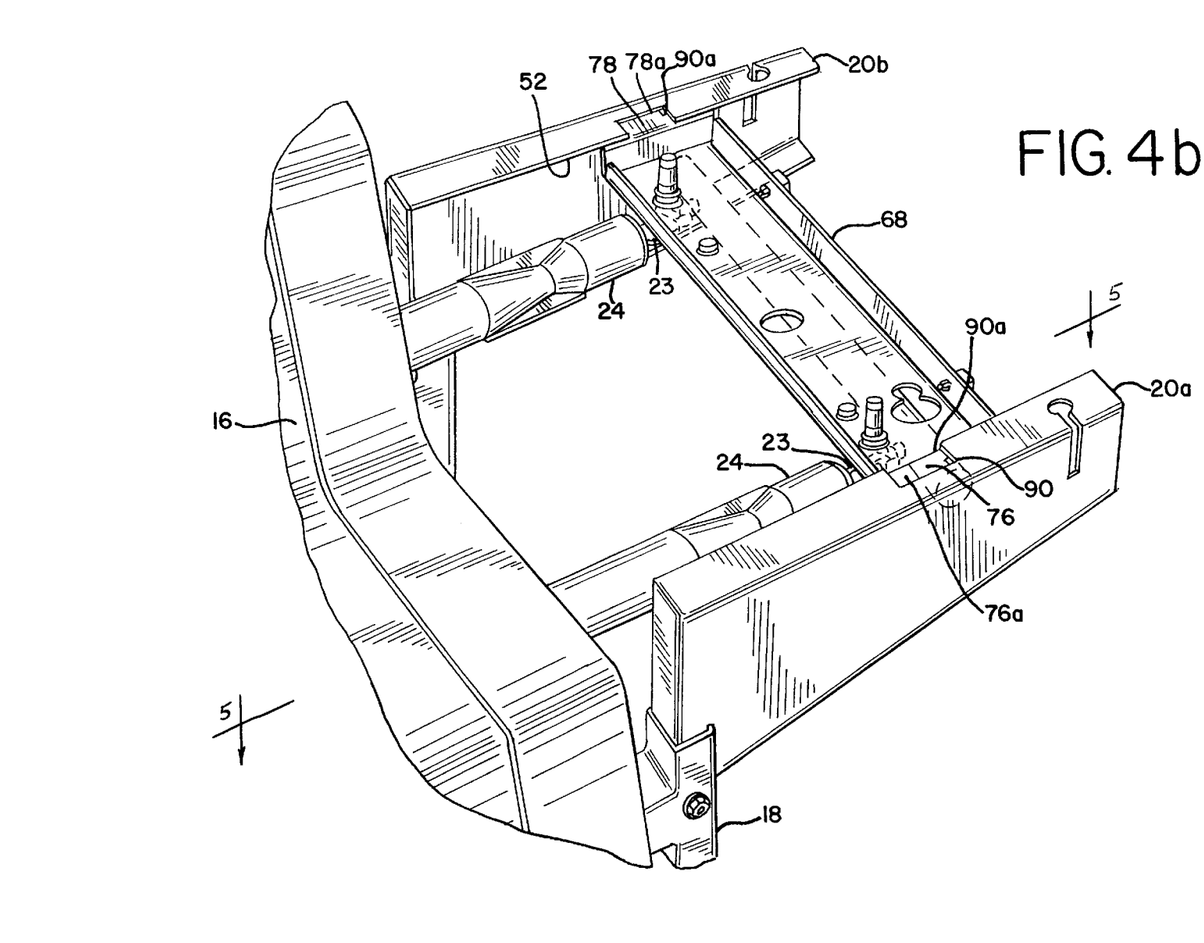
FIG. 4B is a partial front perspective view of the grill of FIG. 1, showing a fully installed gas manifold assembly; and, FIG. 5 is a cross-sectional view taken along line 5—5 of FIG. 4B, with the addition of a top cover.
Figure 5:
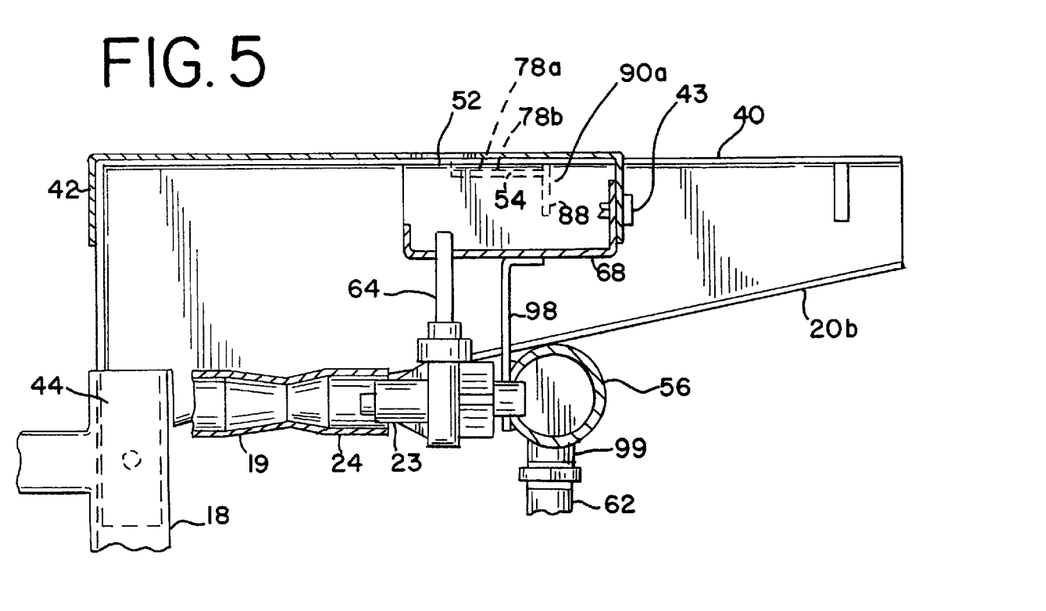

As can be seen in FIGS. 3–5, the gas manifold assembly 12 has at least one generally horizontal mating or engaging surface adapted to engage the generally horizontal support surface of the support member when the gas exit port 23 is properly aligned and fitted in fluid communication with the gas entry port 24. The gas manifold assembly 12 comprises a manifold bracket 68 connected to a gas manifold 56. The manifold bracket 68 has a substantially planar member 70 as the central portion thereof, and a first end 72 and a second end 74 at opposing ends of the planar member 70. A first mating or engaging member 76 extends from the first end 72 of the manifold bracket and a second mating or engaging member 78 extends from the second end 74 of the manifold bracket. In the preferred embodiment mating member 76 has an upper mating surface 76a and a lower mating surface 78a. Similarly, mating member 78 has an upper mating surface 76a and a lower mating surface 78b. The first and second mating members 76,78 are adapted to slidingly engage the support surfaces 52,54 of the support member 20 in an initial engaging position (See FIG. 4A). The first and second mating members 76,78 are also adapted to slidingly engage the support surfaces of the support member in a secondary or final engaging position to accurately secure the gas manifold assembly 12 on the support members 20 (See FIG. 4B).

As further shown in FIGS. 3–5, the manifold bracket 68 has portions thereof which extend in a first plane, and portions thereof which extend in a second and different plane than the first plane. Specifically, the manifold bracket 68 has a first angled member 80 adjacent the first end 72 of the manifold bracket and a second angled member 82 adjacent the second end 74 of the manifold bracket. Each of the angled members 80,82 comprise a substantially vertical portion 84 and a substantially horizontal portion 85. The substantially vertical portion 84 of the first angled member 80 depends from the first end 72 of the manifold bracket and the substantially vertical portion 84 of the second angled member 82 depends from the second end 74 of the manifold bracket. The substantially horizontal engaging member 76 of the first angled member 80 is adjacent the vertical portion 84 thereof. The substantially horizontal engaging member 76 of the first angled member 80 is capable of slidingly engaging the horizontal support surface 40 of the first support member 20a. Similarly, the substantially horizontal engaging member 78 of the second angled member 82 is adjacent the vertical portion 84 thereof. The horizontal engaging member 78 of the second angled member 82 is capable of slidingly engaging the horizontal support surface 40 of the second support member 20b. Thus, the substantially planar portion 70 of the manifold bracket extends in the first plane as defined above, and the first and second engaging members 76,78 of the manifold bracket extend in the second plane residing above the first plane defined above. The first and second planes are generally parallel and in spaced relation, adapted to provide mating engagement of engaging members 76,78 with support surfaces 52,54 above the planar member 70 where the manifold 56 is secured.

As best illustrated in FIGS. 3 and 5, a first tab 86 depends from the first angled member 80 and a second tab 88 depends from the second angled member 82. In the preferred embodiment, the tabs 86,88 depend from the respective mating members 76,78 of the manifold. The tabs 86,88 are generally a portion of the mating members 76,78 which have been bent downward at a 90° angle with respect to the horizontal surface 76,78. Each tab 86,88 is generally transverse to the vertical portion 84 of the angled member 80,82 and substantially perpendicular to the engaging member 76,78 thereof. As explained below, the tabs 86,88 are adapted to engage an edge 90 of the second support surface 54 to position the manifold assembly 12 and to prevent further lateral movement of the manifold bracket 68 toward the burner entry port 24. Additionally, the edge protrusion 90a adjacent the edge 90 of the support surface 54 acts as a key to insert the tab 86,88 in the correct position between the support members 20a,20b and to prevent movement of the manifold bracket 68 between the support members 20a,20b once located.

Additionally, the manifold bracket 68 has a plurality of apertures therethrough. First and second apertures 91,92 extend through the manifold bracket 68 to allow the rotating members of the exit valves 64 to project above the manifold bracket 68 for adjusting the flow of gas to the burners. A third aperture 94 extends through the manifold bracket 68 to secure an igniter switch 95 (not shown) thereto.

As best illustrated in FIG.5, the manifold member 56 of the gas manifold assembly 12 is connected to the manifold bracket 68 by two projections 98 extending from an underside of the manifold bracket 68. The projections 98 are preferably welded to the manifold member 56 to fixedly connect the manifold member 56 to the manifold bracket 68. The manifold member 56 generally comprises a cylindrical chamber 96 having an entry port 99 and at least one exit port 23. The entry port 99 and of the gas manifold provides a means for connecting the gas transfer line 62 from the tank 58 to the manifold 56. In the embodiment illustrated in FIGS. 3–5, the gas manifold 56 has two exit ports 23. The exit ports 23 are dimension to be fitted in fluid communication with the gas entry ports 24 of the burners 19, respectively, when the manifold assembly 12 is operationally positioned (see FIG. 4B).

As shown in FIGS. 3–5, the engaging members 76,78 of the manifold bracket 68 engage the support member 20 partially between the first and second support surfaces 52,54 thereof. Specifically, as shown in FIG. 4A, the engaging member 76 of the first angled member 80 engages the first support member 20a partially between the first and second support surfaces 52,54 thereof. And, the engaging member 78 of the second angled member 82 engages the second support member 20b partially between the first and second support surfaces 52,54 thereof. More specifically, the substantially horizontal upper surface 76a of the engaging member 76 of the first angled member 80 engages the lower portion of the first support surface 52 of the first support member 20a, and the substantially horizontal lower surface 76b of the first engaging member 76 of the first angled member 80 engages the upper portion of the second support surface 54 of the first support member 20a. Similarly, the substantially horizontal upper surface 78a of the engaging member 78 of the second angled member 82 engages the lower portion of the first support surface 52 of the second support member 20b, and the substantially horizontal lower surface 78b of the engaging member 78 of the second angled member 82 engages the upper portion of the second support surface 54 of the second support member 20b. For the manifold bracket 68 to engage the support member 20, the tabs 86,88 of the manifold bracket are positioned in a gap between the first and second support surfaces 52,54 of the support member 20. Once the manifold bracket 68 has been seated on the support member 20 (see FIG. 4A), the manifold bracket 68 can be slid into an operational position in the direction of arrow 100. Through the sliding engagement of the engaging or mating members 76,78 of the manifold bracket 68, and more specifically through cooperation of the engaging surfaces 76a,76b,78a,78b of the engaging members 76,78 and the support surfaces 52,54 of the support members 20a,20b, the engaging members 76,78 of the manifold bracket are slid between the first and second support surfaces 52,54 and toward the entry ports of the burners. As such, the engaging members 76,78 of the manifold bracket are positioned and essentially sandwiched between the support surfaces 52,54 of the support members. The first tab 86 of the manifold bracket will engage an edge 90 of the first support member 20a and the second tab 88 of the manifold bracket will engage an edge 90 of the second support member 20b as a stop to accurately position the gas manifold assembly 12 on the support members 20a,20b. At this point, the gas exit ports 23 of the manifold assembly 12 should be fitted in fluid communication with the gas entry ports 24 of the burners 19.

Once the manifold assembly 12 is operationally positioned, the cover 42 is positioned over an upper surface of the manifold bracket 68. The cover 42 is removably connected to the support members 20. The rotating portions of the gas valves 64 extend through the cover 42 to allow for knobs (not shown) to be attached thereto. Finally, the igniter member 95 is connected to the cover 42. The cover 42 secures the manifold assembly 12 such that the manifold assembly 12 cannot be removed from the support members 20 without removal of the cover 42. The cover 42 optionally is locked in position with one or more fasteners 43. The fastener 43, such as a screw or bolt, secures the cover 42 to the manifold bracket 68, thereby locking the bracket 68 in aligned position and preventing movement of the bracket in the direction opposite of arrow 100. One advantage of this arrangement in the preferred embodiment is a manifold assembly 12 that is easily removable and without the need for threaded fasteners in the manifold. Accordingly, the manifold 56 is aligned in proper position with the burner(s) 19, and assembly is simplified by providing a stop formed from engagement of tabs 86,88 with a first and second edge 90, with a cover 42 positioned over the assembled device to lock the manifold 56 in position.

While the specific embodiments have been illustrated and described, numerous modifications come to mind without significantly departing from the spirit of the invention, and the scope of protection is only limited by the scope of the accompanying Claims.

We claim:

1. A gas supply system for a gas grill having a burner housing connected to a grill support assembly, comprising:
    at least one burner in the housing, the burner having a gas entry port;
    at least one generally horizontal support surface integral with the grill support assembly positioned outside the housing; and,
    a gas manifold assembly having at least one gas exit port dimensioned to be fitted in fluid communication with the gas entry port, and at least one generally horizontal mating surface, the generally horizontal mating surface of the gas manifold assembly adapted to engage the generally horizontal support surface when the gas exit port is fitted in fluid communication with the gas entry port.

2. The gas supply system of claim 1, further comprising a plurality of said generally horizontal support surfaces integral with the grill support assembly.

3. The gas supply system of claim 2, further comprising a plurality of said generally horizontal mating surfaces of the gas manifold assembly adapted to engage the plurality of said generally horizontal support surfaces of the grill support assembly.

4. The gas supply system of claim 1, wherein the support surface is connected to the grill support assembly.

5. The gas supply system of claim 1, wherein the support surface comprises a first support surface and a second support surface, the second support surface being substantially parallel to and spaced a distance from the first support surface.

6. The gas supply system of claim 5, wherein the mating surface of the gas manifold assembly is positioned between the first support surface and the second support surface.

7. The gas supply system of claim 5, wherein the mating surface of the gas manifold assembly slidingly engages the first and second support surfaces.

8. The gas supply system of claim 1, wherein the mating surface of the gas manifold assembly extends in a second horizontal plane and a portion of the gas manifold extends in a first and different horizontal plane than the second horizontal plane.

9. The gas supply system of claim 1, further comprising a tab depending from the mating surface of the gas manifold assembly and adapted to engage an edge of the support surface to position the gas manifold assembly.

10. The gas supply system of claim 1, further comprising a cover positioned over an upper surface of the gas manifold assembly.

11. The gas supply system of claim 1, wherein the support surface is adjacent a side of the housing.

12. The gas supply system of claim 1, wherein the burner housing is supported on the grill support assembly.

13. A gas manifold assembly for a gas grill having a burner housing connected to a grill support assembly, at least one burner in the burner housing, the burner having a gas entry port, and a support member connected to the support assembly having at least one support surface, comprising:
    a manifold bracket connected to a gas manifold, the gas manifold having an exit port in fluid communication therewith, wherein the manifold bracket is adapted to slidingly engage said at least one support surface to position the gas exit port in-line with the gas entry port of the burner.

14. The gas manifold assembly of claim 13, wherein the manifold bracket comprises a substantially planar member having engaging surfaces at opposed first and second ends adapted to engage the support member.

15. The gas manifold assembly of claim 13, further comprising a first support member having a support surface and a second support member having a support surface, wherein the manifold bracket has a first end, a second end, a first engaging surface extending from the first end and a second engaging surface extending from the second end, wherein the first and second engaging surfaces are adapted to engage the support surfaces of the support member in an initial engaging position, and wherein the first and second engaging surfaces are adapted to engage the support surfaces in a secondary position to accurately secure the gas manifold assembly on the support members.

16. The gas manifold assembly of claim 15, wherein the planar portion of the manifold bracket extends in a first plane and the first and second engaging surfaces extend in a second and different plane than the first plane of the manifold bracket.

17. The gas manifold assembly of claim 15, further comprising a first tab depending form the first engaging surface and adapted to engage the support member to position the gas manifold assembly with respect to the support member.

18. The gas manifold assembly of claim 15, further comprising a first tab depending from the first engaging surface and a second tab depending from the second engaging surface, the first and second tabs adapted to engage the support member to position the gas manifold assembly with respect to the support member.

19. A gas supply system for a gas grill having a burner housing connected to a grill support assembly, comprising:
   at least one burner in the housing, the burner having a gas entry port exposed from the housing;
   support members positioned outside the burner housing, the support members having a support surface, wherein a plane of the support surface of the support members are substantially in-line with the gas entry port of the burner; and,
   a gas manifold assembly having a manifold bracket connected to a gas manifold having at least one exit port, wherein the manifold bracket has a substantially planar portion having a first end and a second end, the first and second ends having engaging surfaces which slidingly engage the support surface of the support members, respectively, when the gas exit port of the gas manifold is fitted in fluid communication with the gas entry port of the burner.

20. The gas supply system of claim 19, wherein the manifold bracket further comprises a first angled member and a second angled member, the first angled member adjacent the first end of the manifold bracket and the second angled member adjacent the second end of the manifold bracket, wherein the first angled member has a substantially horizontal engaging surface capable of slidingly engaging the horizontal support surface of the support member, and wherein the second angled member has a substantially horizontal engaging surface capable of slidingly engaging the horizontal support surface of the support member.

21. The gas supply system of claim 20, wherein the first angled member has a substantially horizontal upper engaging surface and a substantially horizontal lower engaging surface, at least the lower engaging surface being capable of slidingly engaging the horizontal support surface of the support member, and wherein the second angled member has a substantially horizontal upper engaging surface and a substantially horizontal lower engaging surface, at least the lower engaging surface being capable of slidingly engaging the horizontal support surface of the support member.

22. The gas supply system of claim 20, wherein the support member further comprises a first support surface and a second support surface, the second support surface substantially horizontal to and spaced a distance from the first support surface, wherein a portion of the manifold bracket engages the support member partially between the first and second support surfaces thereof, wherein the first angled member has a substantially horizontal upper engaging surface and a substantially horizontal lower engaging surface, the lower engaging surface being capable of slidingly engaging the second horizontal support surface of the support member, and wherein the second angled member has a substantially horizontal upper engaging surface and a substantially horizontal lower engaging surface, the lower engaging surface being capable of slidingly engaging the second horizontal support surface of the support member.

23. The gas supply system of claim 19, wherein the substantially planar portion of the manifold bracket extends in a first plane, and wherein the substantially horizontal portion of the first angled member extends in a second and different plane than the first plane, the first and second planes being parallel.

24. The gas supply system of claim 23, wherein the substantially horizontal engaging surface of the second engaging member extends in the second plane.

25. The gas supply system of claim 24, further comprising a first tab extending away from the manifold bracket and adapted to engage the support member to position the gas manifold assembly with respect to the support member.

26. The gas supply system of claim 25, further comprising a second tab extending away from the manifold bracket and adapted to engage the support member to position the gas manifold assembly with respect to the support member.

27. The gas supply system of claim 26, wherein the first tab extends substantially perpendicular to the substantially horizontal engaging surface of the manifold bracket.

28. The gas supply system of claim 19, wherein the support member further comprises a first support surface and a second support surface, the second support surface substantially horizontal to and spaced a distance from the first support surface, and wherein a portion of the manifold bracket engages the support member partially between the first and second support surfaces thereof.

29. The gas supply system of claim 28, wherein the manifold bracket has a first tab depending therefrom, the first tab engaging an edge of the second support surface of the support member to prevent further lateral movement of the manifold bracket toward the burner entry port.

30. The gas supply system of claim 19, wherein the manifold bracket further has an aperture therethrough for placement therewithin of a rotating member of the exit port.

31. The gas supply system of claim 19, wherein the manifold bracket further has an aperture therethrough and adapted to secure an ignitor.

32. A removable gas manifold assembly for a gas grill having a burner housing supported on a frame, at least one burner in the housing and the burner having a gas entry port positioned outside the burner housing, the removable gas manifold assembly comprising:
   a plurality of support members having a substantially horizontal support surface depending from the support frame, the support members adapted to be removably fixed to the support frame; and,
   a gas manifold assembly having a manifold bracket comprising a substantially planar portion having a first end and a second end, a first angled member adjacent the first end of the manifold bracket and a second angled member adjacent the second end of the manifold bracket, wherein the first and second angled members have a substantially horizontal portion thereto, respectively, defining engaging surfaces, and wherein the engaging surfaces of the first and second angled members slidingly engage the support surface of the support members, and a gas manifold connected to the manifold bracket and having a gas valve in fluid communication therewith, wherein the gas valve has an exit port which is adapted to be in fluid communication with the entry port of the burner when the manifold is operationally positioned.

33. The gas manifold assembly of claim 32, wherein the support surface of each support member comprises a first support surface and a second support surface, the second support surface substantially parallel to and spaced a distance from the first support surface, and wherein the engaging surfaces of the manifold bracket engage the support member partially between the first and second support surfaces thereof.

34. The gas manifold assembly of claim 32, wherein the support surface of a first support member comprises a first support surface and a second support surface, wherein the support surface of a second support member comprises a first support surface and a second support surface, the second support surface of the first and second support members being substantially parallel to and spaced a distance from the first support surface of the first and second support members, respectively, wherein the engaging surface of the first angled member slidingly engages the first support member partially between the first and second support surfaces thereof, and wherein the engaging surface of the second angled member slidingly engages the second support member partially between the first and second support surfaces thereof.

35. The gas manifold assembly of claim 34, further comprising a first tab depending from the first angled member and a second tab depending from the second angled member, the first tab adapted to engage an edge of the first support member and the second tab adapted to engage an edge of the second support member to accurately position the gas manifold assembly on the support members.

* * * * *